(12) United States Patent
Tian et al.

(10) Patent No.: US 7,549,146 B2
(45) Date of Patent: Jun. 16, 2009

(54) APPARATUS, SYSTEMS, AND METHODS FOR EXECUTION-DRIVEN LOOP SPLITTING AND LOAD-SAFE CODE HOSTING

(75) Inventors: Xinmin Tian, Union City, CA (US); Milind B. Girkar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 835 days.

(21) Appl. No.: 11/157,441

(22) Filed: Jun. 21, 2005

(65) Prior Publication Data

US 2006/0288334 A1  Dec. 21, 2006

(51) Int. Cl.
*G06F 9/45* (2006.01)
(52) U.S. Cl. .................. 717/150; 717/148; 717/151; 717/152; 717/160
(58) Field of Classification Search .............. None
See application file for complete search history.

(56) References Cited

U.S. PATENT DOCUMENTS 6,324,643 B1 * 11/2001 Krishnan et al. ............ 712/237
7,222,337 B2 * 5/2007 Click et al. .................. 717/160

\* cited by examiner

*Primary Examiner*—Chuck O Kendall
(74) *Attorney, Agent, or Firm*—Schwegman, Lundberg & Woessner, P.A.

(57) ABSTRACT

Techniques for execution-driven loop splitting and load-safe code hosting are provided. Compiled code includes statements associated with an original loop and statements associated with an alternative loop. The alternative loop reproduces the original loop except for conditional load-safe invariant expressions that appeared in the original loop and that are separated out of the alternative loop. During processing, once the conditional load-safe invariant expressions are computed and referenced for a first time within the original loop, processing dynamically switches to the alternative loop where the conditional load-safe invariant expressions are computed outside of the alternative loop and referenced from within the alternative loop.

10 Claims, 5 Drawing Sheets

APPARATUS, SYSTEMS, AND METHODS FOR EXECUTION-DRIVEN LOOP SPLITTING AND LOAD-SAFE CODE HOSTING

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screen shots that may be described below and in the drawings that form a part of this document: Copyright 2005, Intel® Corporation. All Rights Reserved.

BACKGROUND INFORMATION

While processing loops within application software (code), it is more processor and memory efficient to remove and load loop expressions in statements that will execute at least once outside the context of the loop. This permits such expressions to be resolved once and referenced as needed from locations outside the scope of the loop thereby providing more processor and memory efficient compiled code.

However, whether a statement will execute is sometimes not determinable at compile time, and thus such a statement may not be safely loaded outside the context of the loop statements. For example, in the statement "if A then X/Y," A will be evaluated; but at compile time it cannot be determined whether or not "X/Y" will be evaluated. Moreover, it may not be safe to assume that "X/Y" will execute, because Y may be zero at runtime resulting in an error condition. The statement itself may therefore never present a problem within the loop, because A may never evaluate to true, such that "X/Y" will execute to produce the error. Statements for which it is not known whether they will execute at runtime are referred to as "invariant expressions."

Two approaches have been attempted to safely load invariant expressions. The first is referred to as "profile-guided loop invariant code motion." Here, profile information is used to compute probabilities that invariant expressions will execute at compile time. Yet, this approach cannot ensure that an invariant expression will execute; it only provides a probability that an invariant expression is likely or not likely to execute. The second approach is referred to "speculative loop invariant code motion." With this approach, additional hardware support is used to check on load safety before statements are loaded.

DESCRIPTION OF EMBODIMENTS

Figure 1:
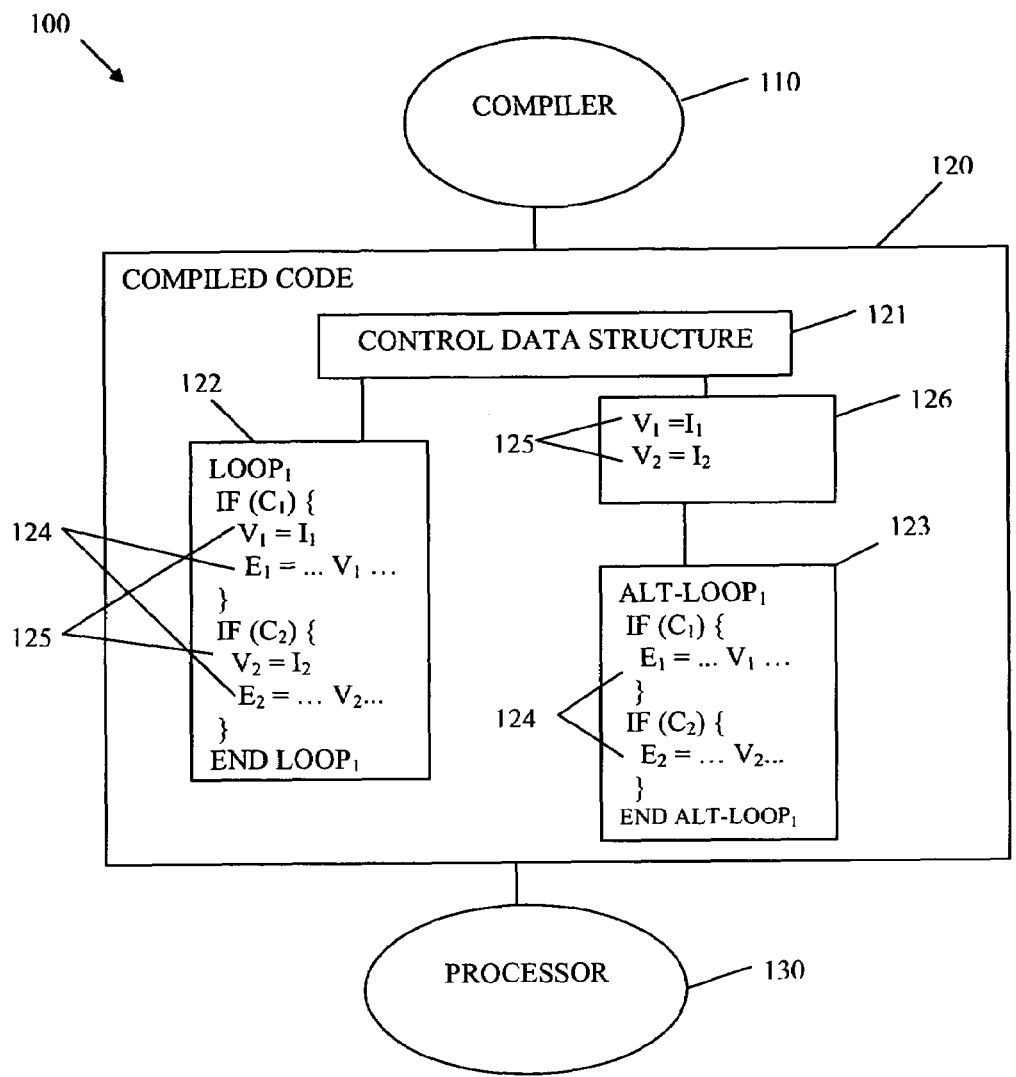
FIG. 1 is an architectural diagram of an execution-driven loop splitting system, according to an example embodiment.

FIG. 1 is an architectural diagram of an execution-driven loop splitting system 100, according to an example embodiment. The execution-driven loop splitting system 100 is implemented in a machine-accessible and readable medium within hardware and software components.

The execution-driven loop splitting system 100 includes a compiler 110, compiled code 120, and a processor 130. Each of these will now be discussed in turn.

The compiler 110 produces the compiled code 120. The compiled code 120 represents machine code that the processor 130 executes at runtime. The compiled code 120 includes a control data structure 121, an original block of statements associated with an original loop 122, and an alternative block of statements associated with an alternative loop 123.

The original loop 122 includes a number of expressions 124 and one or more conditional load-safe invariant expressions 125. The conditional load-safe invariant expressions 125 are expressions for which it cannot be determined at compile time whether the invariant expressions will execute at runtime when the processor 130 is executing the compiled code 120. Stated another way, a conditional load-safe expression is an invariant expression loaded under an "if" or "else" branch conditionally within a loop.

The compiler 110 identifies the conditional load-safe invariant expressions 125 inside the original loop 122 and creates an alternative loop 123 within the compiled code along with a control data structure 121. The alternative loop 123 includes the non-invariant expressions 124 from the original loop 122 and in that sense is a partial clone of the original loop 122. However, the conditional load-safe invariant expressions 125 are separated outside the block of statements associated with the alternative loop 123; they are referenced within the alternative loop 123, but executed outside the alternative loop 123 via the block of statements 126.

The control data structure 121 includes a flag, such as a bit location for each conditional load-safe invariant expression 125 of the original loop 122. Initially, at compile time, the compiler 110 sets each bit within the control data structure 121 to false or unset (e.g., "0" value).

During execution, the processor 130 executes the block of statements associated with the original loop 122. When a conditional load-safe invariant expression 125 is executed within the original loop 122, the processor 130 sets its corresponding flag in the control data structure 121. Once each flag is set within the control data structure 121, indicating that each conditional load-safe invariant expression 125 in the original loop 122 has executed at least once, the processor 130 dynamically and in real time switches or branches to the alternative loop 123 to continue subsequent processing that may occur within the compiled code 120. The conditional load-safe invariant expression 125 is executed in the block of statements 126 in advance of being referenced within the alternative loop 123. Thus, when a conditional load-safe invariant expression 125 is subsequently referenced within the alternative loop 123, the results of that conditional load-safe invariant expression 125 can be acquired by reference within the alternative loop 123 to the appropriate conditional load-safe invariant expression 125 within the block of statements 126.

Thus, the compiled code 120 may initially experience a certain level of performance as the compiled code 120 is executed by the processor 130. Once the control data structure 121 indicates that each loop conditional load-safe invariant expression 125 has executed at least once within the original loop 122, the processor 130 switches to the alternative loop 123. The alternative loop 123 is optimized because the conditional load-safe invariant expressions 125 do not have to be continually expanded, loaded, and resolved during each iteration of the alternative loop 123. This is so, because the conditional load-safe invariant expressions 125 are split or separated from the alternative loop 123 and executed or resolved in advance of a reference to them in the block of statements 126. Thus, at some point in processing, the compiled code 120 experiences improved performance and can be considered optimized in view of the processing originally associated with the original loop 122.

An example block of pseudo code for implementing the alternative loop 123 within the compiled code 120 is provided below for purposes of illustration. It is understood that other techniques that provide for alternative blocks of code within a compiled code 120 may be implemented without departing from the embodiments presented herein. In the sample pseudo code that follows, "LSC" refers to Loop Splitting Code.

There are 3 loop invariants Y[o], fl_layer[o][ti].P, and busp[ti] in the above sample source code. The compiler 110 cannot prove that it is safe to apply loop invariant code motion to separate them from the original loop 122, because the compiler 110 does not know whether the IF-branch that guides the memory references is taken or nor taken at compile time. However, if the compiler 110 did know that the IF-branch is taken at least once in the first few iterations of execution performed by the processor 130, then the loop invariants may be safely separated in an alternative loop 123.

The first block of code above will split the sample loop code into two loops: an original loop 122 and an alternative loop 123. The original loop 122 is used to ensure load safety of the conditional load-safe invariant expressions 125 by ensuring that the conditional load-safe invariant expressions 125 are executed at least once. Once the processor 130 validates or confirms this via the control data structure 121, the alternative loop 123 is processed for the compiled code 120, rather than the original loop 122. Thus, the original loop 122 drives the determination as to when the alternative loop 123 is

```
1   void Execution_Driven_Loop_Splitting_and_Invariant_Code_Motion (loop) {
2      Loop-Invariant-Analysis(loop);
3      LSC_size=0; Branch_ID=0; Load_Safe_Invariant_List= NULL;       /* Initialization */
4      FOR_ECAH_LOOP_INVARIANT (loop, IE) {    /* IE denotes Invariant Expression */
5         if (seen_in_Branch(IE, br) && not_numbered_Branch(br)) {
6         /*no need to worry about an IE in both TRUE and FALSE branch, as standard PRE can handle it */
7            Tag_Branch_and_Assign_Id(br, Branch_ID);       /*Branch numbering and tagging */
8            Insert(Load_Safe_Invariant_List, IE);
9            LSC_size++; Branch_ID++;         /* Branch ID is the index of LSC bit-vector */
10        }
11     }END_FOR_EACH_LOOP_INVARIANT
12
13     if (LSC_size > 0) {        /* LSC_size = 0 indicates all loads are safe with standard PRE */
14        cloop = Static_Loop_Cloning(loop); /* cloop is pointer that points the cloned loop structure */
15        Create_TEMP(LSC, LSC_size); /*create LSC bit-vector with 32-bit increment based on LSC_size*/
16        FOR_ECAH_NUMBERED_BRANCH(cloop, br) {
17           Generate and insert the statement Bit_SET(LSC, br, TRUE) for branch br
18        }END_FOR_NUMBERED_BRANCH
19
20        Insert_Cloned_Loop(loop, cloop);      /* insert the cloned loop before original loop */
21        Gen_Runtime_Loop_Splitting_Control_Code(loop, cloop, LSC); /*insert it before bottom test stmt */
22
23        FOR_EACH_LOAD_SAFE_LOOP_INVARIANT (loop, IE) {
24           Load-safe-loop-invariant-code-motion (loop, IE);
25        }END_FOR_EACH_LOAD_SAFE_LOOP_INVARIANT
26     }
27  }
                         © 2005 by Intel ® Corporation
```

For purposes of describing the above example implementation, consider the following source code that is being compiled:

```
void compute_valus_match(int o, int *fires, int *spot, double **busp) {
   ... ... ...
   for (ti=0; ti<varNumF1; ti++) {
      for (tj=*spot; tj<varNumF2; tj++)
         if ( !Y[o][tj].reset ) {
            Y[o][tj].y += fl_layer[o][ti].P * busp[ti][tj];
         }
   }
}
                         © 2005 by Intel ® Corporation
``` executed by the processor 130 by facilitating the setting of flags in the control data structure 121 for each loop conditional load-safe invariant expression 125, once each conditional load-safe invariant expression 125 is processed a first time within the original loop 122.

When the alternative loop 123 is invoked by the processor 130, in response to the control data structure 121, execution picks up within the alternative loop 123 where it left off within the original loop 122. Therefore, there is no computational duplication between the two loops 122 and 123. This is referred to herein as "execution-driven loop splitting."

An example block of pseudo code to test for and set flags within the control data structure 121 and to branch to the alternative loop 123 for the above-provided examples may appear as follows:

```
void compute_valus_match(int o, int *fires, int *spot, double **busp) {
    ... ... ...
    for (ti=0: ti<varNumF1: ti++) {
        init_state_tj = *spot;
        for (tj=*spot; tj<varNumF2; tj++) {
            if ( !Y[o][tj].reset ) {
                Y[o][tj].y += f1_layer[o][ti].P * busp[ti][tj];
                BitSet (LSC, 0, TRUE);              /* LSC is a 32-bit unsigned int for this case */
            }
            if (LSC_bit_test(LSC, 0)) {             /* Execution-driven loop splitting control code */
                init_state_tj = tj + 1; goto SPLIT;   /* if LSC bit 0 is 1, jump to the optimized loop */
            }
        }
    SPLIT:
        if (tj >= varNumF1) goto DONE;     /* work is done, no need to active the optimized loop */
        {
            *double temp_busp = busp[ti]
            double temp_fl_layer_p = fl_layer[o][ti].P;
            *double temp_Y = Y[o];
            tj=init_state_tj;
        L1:
            if ( !temp_Y[tj].reset ) {
                temp_Y[tj].y += temp_fl_layer_p * temp_busp[tj];
            }
            tj = tj +1;
            If (tj<varNumF2) goto L1;
        }
    DONE:
    }
    ... ... ...
}
                                    © 2005 by Intel ® Corporation
```

Once the alternative loop 123 is processed by the processor 130, there have been assurances that the safety of the conditional load-safe invariant expressions 125 has been adequately addressed, since these conditional load-safe invariant expressions 125 are known to have been processed with the context of the original loop 122 at least once. Therefore, the loading and execution of the conditional load-safe invariant expressions 125 outside the alternative loop 123 has been established by the time the processor 130 switches to the alternative loop 123, and the results associated with the conditional load-safe invariant expressions 125 can be acquired from the third block of statements 126 via references to them from within the alternative loop 123.

It should also be noted that the cost associated with implementing the above technique in terms of processing throughput is minimal, because once the conditional load-safe invariant expressions 125 execute a first time; the alternative loop 123 is immediately processed for subsequent iterations. Moreover, the alternative loop 123 is optimized, because the conditional load-safe invariant expressions 125 are loaded and executed outside the alternative loop 123 and are separated from the other expressions 124. Accordingly, the compiled code 120 results in more processor and memory efficient execution than just compiled code having only the original loop 122.

In an embodiment, a variety of heuristics may also be implemented within the compiler 110 to decide whether the alternative loop 123 and the control data structure 121 should remain within the compiled code 120. In other words, it may be desirable to establish a threshold size for the compiled code 120, and if the size of the compiled code 120 is equal to or exceeds that threshold, then the compiler 110 automatically removes the control data structure 121 and the alternative loop 123. In another embodiment, runtime parameters may manually instruct the compiler 110 to remove the control data structure 121 and the alternative loop 123.

Although the control data structure 121 is shown for purposes of illustration as being within the compiled code 120, this arrangement does not have to always be the case. For instance, the control data structure 121 may reside entirely outside the compiled code and be referenced via a pointer or be referenced as a separate file or entry in a data store or register. For that matter, in some embodiments, where only a single conditional load-safe invariant expression 125 exists within the compiled code 120, the control data structure 121 may simply be a single bit retained or tracked by the processor 130.

Figure 2:
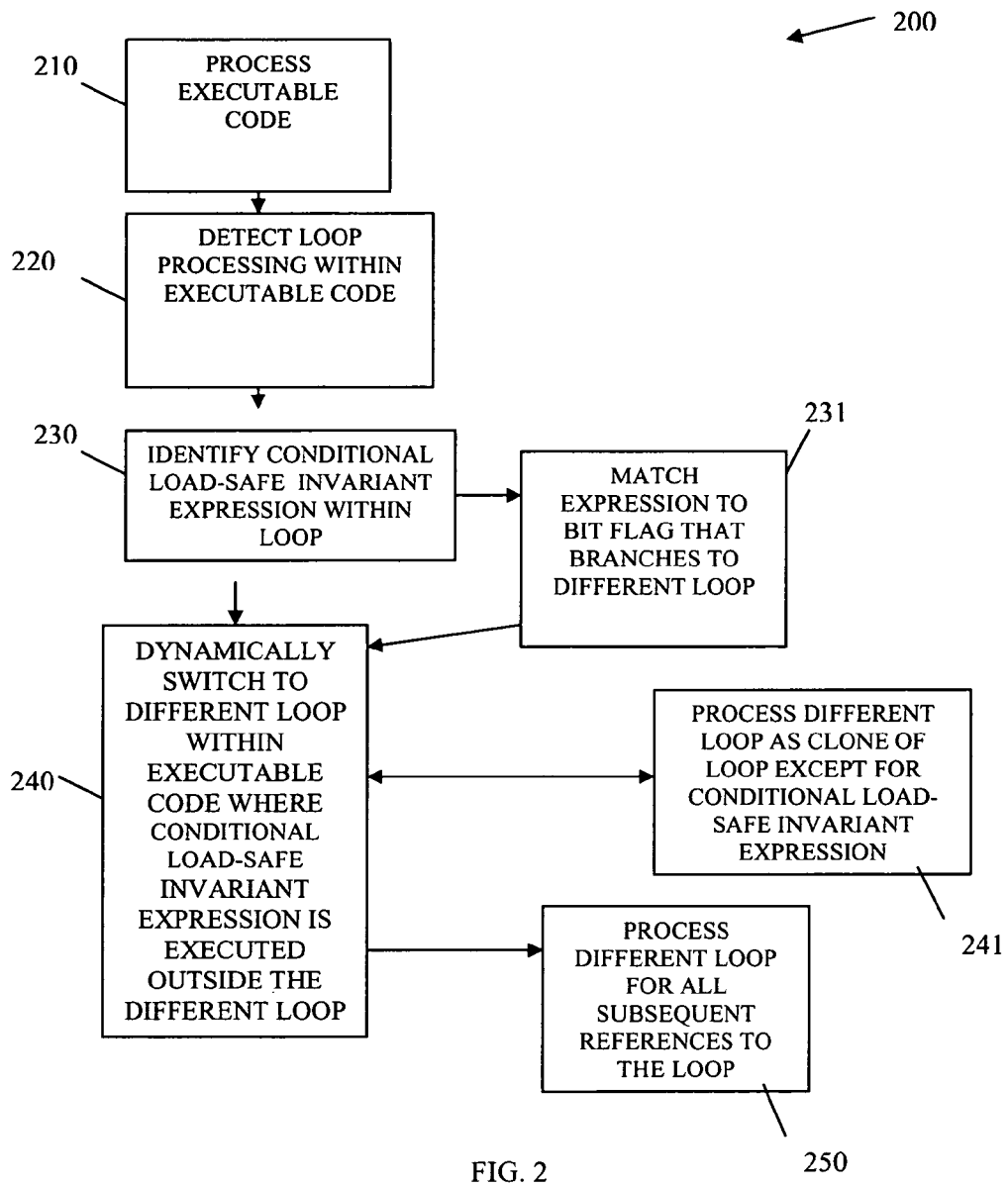
FIG. 2 is a diagram of a method to process a split loop within code, according to an example embodiment.

FIG. 2 is a diagram of a method 200 to process a split loop within code, according to an example embodiment. The method 200 (hereinafter "loop-execution service") is implemented in a machine-accessible and readable medium. In an embodiment, the loop-execution service is implemented within the processor 130 of the architecture 100 depicted in FIG. 1.

Initially, at 210, the loop-execution service processes executable code associated with an application. Executable code is represented as machine instructions that the loop-execution service executes. It may also be viewed as compiled code, which a compiler has produced from source code (the application).

At some point during processing, the loop-execution service detects, at 220, a loop that is being processed within the executable code. This may be identified with a specific statement within the executable code or reference. Alternatively, this may be identified by a branch statement within the executable code.

At 230, the loop-execution service identifies a conditional load-safe invariant expression within the loop that is being processed for the executable code. In an embodiment, at 231, the reference or line number associated with the conditional load-safe invariant expression is matched by the loop-execution service to a bit flag that uniquely identifies the expression being processed as the conditional load-safe invariant expression.

Once the conditional load-safe invariant expression processes a first time within the executable code, the loop-execution service, at 240, switches dynamically and in real time to a different loop within the executable code for continued processing. At 241, the different loop is a clone of the original loop that was detected; except that the conditional load-safe invariant expression is referenced from a block of statements associated with the different loop and is executed and resolved outside the different loop. This means that the conditional load-safe invariant expression is not continually loaded and evaluated into memory with subsequent iterations of the different loop; rather the conditional load-safe invariant expression is loaded and evaluated from a separate location from outside the block of statements associated with the different loop. It is also executed before the reference is used within the different loop.

At 250, the loop-execution service continues to process the different loop, which has the conditional load-safe invariant expression separated therefrom, for subsequent iterations made to the original loop. In this manner, the original loop's processing is dynamically optimized in real-time, since initially the loop-execution service processes the original non-optimized loop statements within the executable code, and then when it is safe to switch, the loop-execution service switches to the different loop that is optimized by having the conditional load-safe invariant expression separated out from the different loop statements, but referenced from within the different loop statements.

Figure 3:
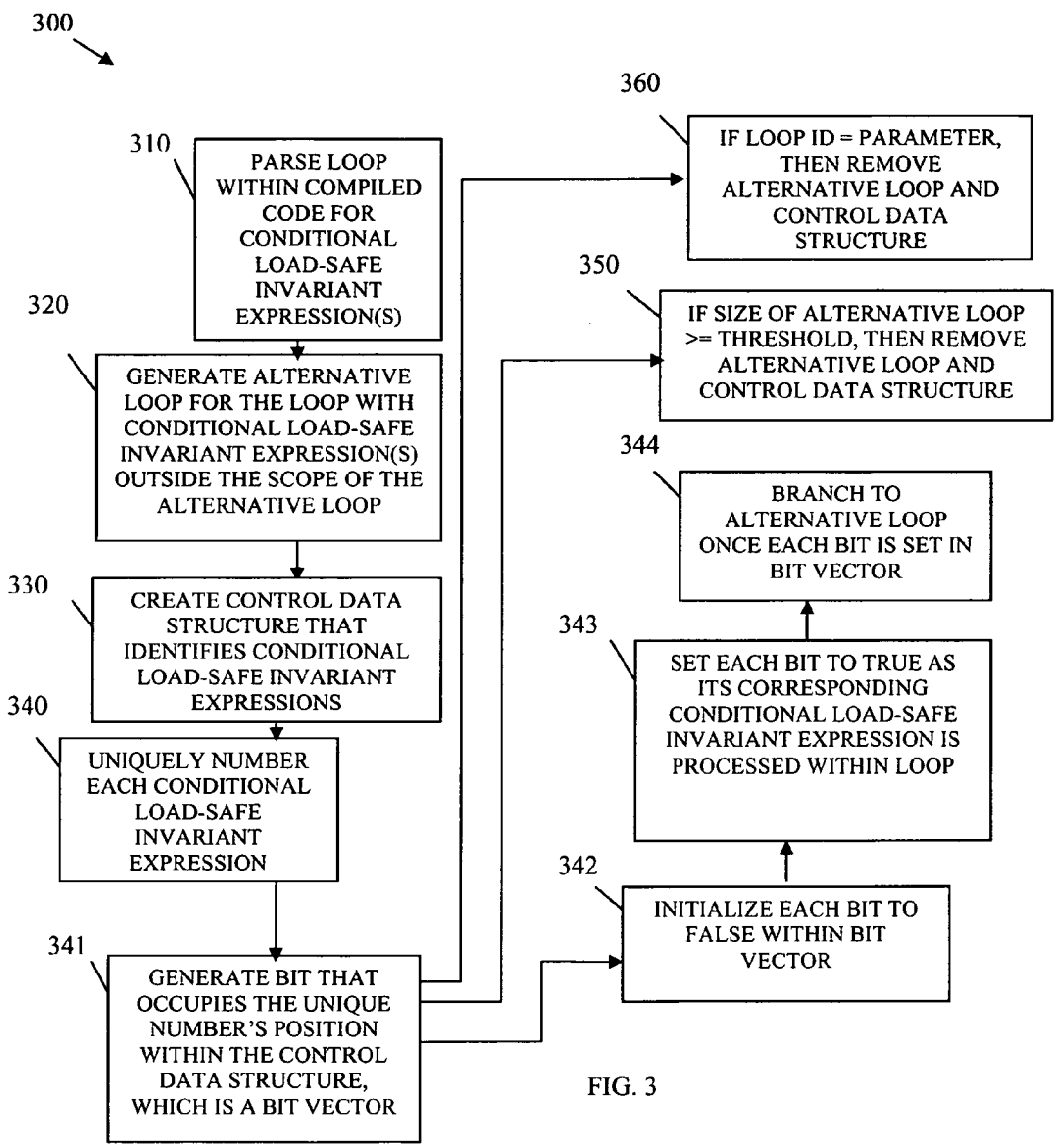
FIG. 3 is a diagram of a method to split a loop, according to an example embodiment.

FIG. 3 is a diagram of a method 300 to split a loop, according to an example embodiment. The method 300 (hereinafter "loop-splitting service") is implemented in a machine-accessible and readable medium. In an embodiment, the loop-splitting service is implemented within the compiler 110 as depicted in FIG. 1 for purposes of producing the alternative loop 123 and the control data structure 121.

In another embodiment, the loop-splitting service is implemented as a post-processing service to a compiler. That is, the loop-splitting service does not have to be implemented within a compiler; rather, the loop-splitting service may take the output of a compiler (compiled code) and process it in the manners discussed herein.

Initially, at 310, the loop-splitting service parses or scans code within compiled code for a loop and more particularly for conditional load-safe invariant expressions referenced within a loop. Again, a conditional load-safe invariant expression is an expression that cannot be resolved at compile time for purposes of deciding whether that particular expression will ever actually execute when the compiled code is processed by a processor, and the expressing is loaded under and "if" or "else" branch within a loop. A good example is an if-then expression, where the first part of the "if" includes a variable that is not resolved until executed. Here, the "if" part executes, but it is not known until runtime as to whether the "if" part will ever evaluate to true, such that the "then" part will in fact execute. The "then" part is considered a conditional load-safe invariant expression.

At 320, the loop-splitting service generates an alternative loop for the detected loop. In the alternative loop, the conditional load-safe invariant expressions are executed outside the other statements associated with the alternative loop. That is, a pointer to the conditional load-safe invariant expressions from within the alternative loop is referenced as a branch within the compiled code, such that processing branches from within the alternative loop statements to locations outside the scope of the alternative loop when the conditional load-safe invariant expressions are executed within the compiled code. Prior to an executed reference, the conditional load-safe invariant expressions are resolved or processed and the results are available when reference to the conditional load-safe invariant expressions is processed within the alternative loop. This actually makes the execution of the alternative loop more processor and memory efficient, and the alternative loop becomes more compact. Any non-invariant expressions that were in the original loop are reproduced or cloned within the alternative loop.

At 330 and as the alternative loop is being generated, the loop-splitting service also creates a control data structure. The control data structure uniquely identifies each of the conditional load-safe invariant expressions occurring within the original loop.

One way to do this, at 340, is to identify the line or statement number of a conditional load-safe invariant expression within the original loop. Each of these line numbers may then be sequentially associated with a bit that occupies a unique position within the control data structure, such that the control data structure becomes a bit string or bit vector, at 341. Initially, at 342, each bit within the bit vector is unset or set to false. This occurs before any execution of the compiled code occurs. In an embodiment, at 343, as the compiled code is executed and a conditional load-safe invariant expression is executed within the original loop, the corresponding bit associated with an executed conditional load-safe invariant expression is set to true (e.g., value "1"). At 344, once all bits within the bit vector are set, the processing dynamically switches from the original loop to the alternative loop, where the conditional load-safe invariant expressions are referenced within the alternative loop but resolved or executed outside the alternative loop.

In an embodiment, at 350, the loop-splitting service may elect to remove the generated alternative loop and the control data structure from the compiled code. For example, a predetermined or threshold size associated with the compiled code may be compared against the actual size of the compiled code, and if the actual size is greater than or equal to the threshold, then the control data structure and the alternative loop are removed from the compiled code.

In still another embodiment, at 360, each loop within the compiled code may be associated with an identifier or a reference, such that a developer may provide the identifiers as runtime parameters to the loop-splitting service. If matches occur, then the alternative loop and control data structure are removed from the compiled code.

In fact, a variety of heuristics may be implemented to decide whether it is desirable to remove the control data structure and the alternative loop. These heuristics may be implemented as profiles, header files, runtime parameters, environmental variables, and the like, which the loop-splitting service evaluates to decide whether to remove the control data structure and the alternative loop.

Figure 4:
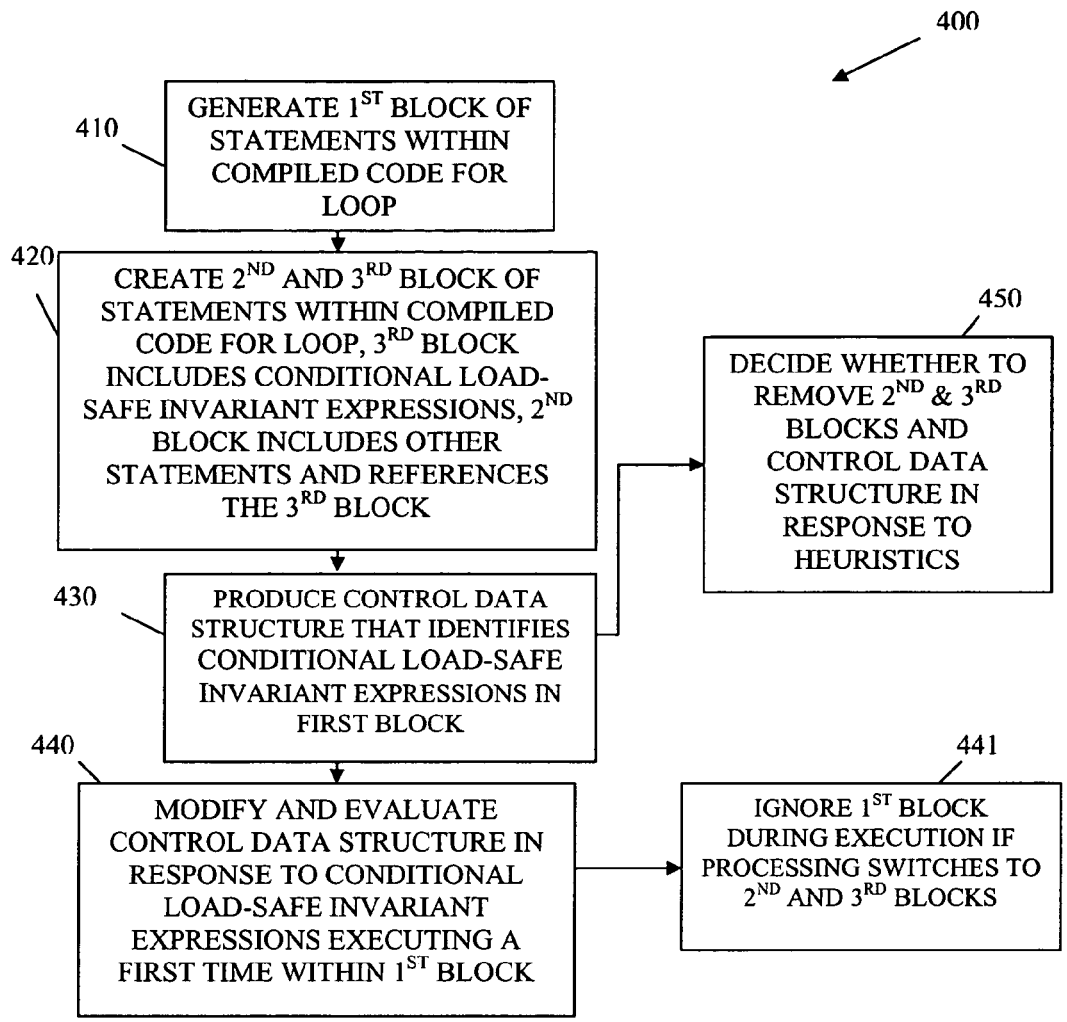
FIG. 4 is a diagram of a method to split and process a loop, according to an example embodiment.

FIG. 4 is a diagram of a method 400 to split and process a loop, according to an example embodiment. The method 400 is implemented as machine-accessible and readable instructions. The instructions when accessed by a machine perform the processing for the method 400 depicted in FIG. 4.

In an embodiment, the instructions reside on a removable medium and are interfaced to a machine, where they are uploaded and processed to perform the method 400. In an alternative embodiment, the instructions are prefabricated within memory and/or storage of a machine, where they are loaded and processed. In yet another embodiment, the instructions are acquired from a remote machine or storage device over a network and downloaded over the network to a machine, where they are processed. In still another embodiment, the instructions reside on a remote machine over a network and are processed at the direction of a different machine residing on the network.

At 410, the instructions are processed on a machine to generate a first block of statements within a compiled code for a loop. The first block of statements is "machine-readable," which means that they may be directly processed by the machine.

At 420, the instructions execute for purposes of generating second and third blocks of statements. The second block of statements reproduces the processing logic of the first block of statements and includes non-invariant expressions references identified from within the first block of statements. The third block of statements includes the conditional load-safe invariant expressions associated with the first block of statements.

The compiled code includes the first, second, and third block of statements. Moreover, the first block of statements is logically equivalent to the processing associated with the combined second and third block of statements. However, the combined second and third block of statements represents an alternative processing technique to the first block of statements and is considered to be more optimal, because the conditional load-safe invariant expressions of the third block of statements are not executed within the loop associated with the second block of statements. Thus, when the second and third block of statements executes, the conditional load-safe invariant expressions are not repeatedly loaded and evaluated within the second block of statements; rather, the branches within the second block of statements acquire the already pre-loaded and pre-evaluated conditional load-safe invariant expressions from the external third block of statements.

At 430, and while the second and third block of statements are generated, the instructions produce a control data structure. The control data structure identifies the line statements associated with each of the conditional load-safe invariant expressions identified within the first block of statements. A flag or bit is associated within the control data structure for each unique conditional load-safe invariant expression detected within the first block of statements.

After 430, the instructions have produced a modified compiled code, where the original loop represented by the first block of statements is reproduced in machine code within the compiled code along with an alternative loop, which is optimized, represented by the second and third block of statements. Moreover, a control data structure is produced and associated with the modified compiled code. The control data structure may reside within the modified compiled code or may be associated with the modified compiled code as metadata.

When the modified compiled code is executed, the instructions dynamically and in real time modify and evaluate, at 440, the control data structure in response to execution of the conditional load-safe invariant expressions within the first block of statements. That is, when a conditional load-safe invariant expression is executed a first time within the first block of statements, the corresponding flag or bit for that conditional load-safe invariant expression is set in the control data structure. Once each bit within the control data structure is set, the instructions switch to the second and third block of statements for all subsequent iterations that may occur for the original loop. Thus, at 441, the first block of statements is ignored during execution if the instructions switch to the second and third blocks of statements.

In an embodiment, at 450, the instructions may use heuristics to decide whether to remove the second and third blocks of statements and the control data structure from the compiled code. Examples for these embodiments were provided above.

Figure 5:
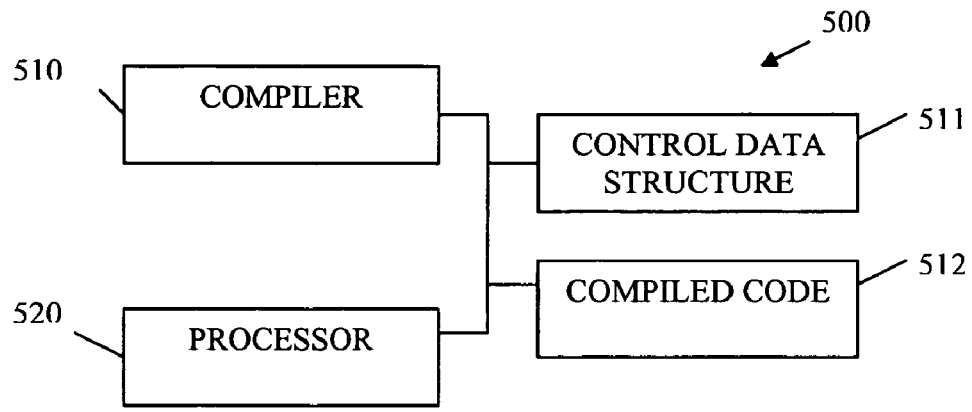
FIG. 5 is a diagram of an execution-driven loop splitting apparatus, according to an example embodiment.

FIG. 5 is a diagram of an execution-driven loop splitting apparatus 500, according to an example embodiment. The execution-driven loop splitting apparatus 500 is implemented in a machine-accessible and readable medium.

The execution-driven loop splitting apparatus 500 includes a compiler 510 and a processor 520. The compiler 510 produces a control data structure 511 and compiled code 512. The processor 520 executes the compiler 510 and executes the compiled code 512 using the control data structure 511.

The compiler 510 produces an alternative loop within the compiled code 512 for each detected original loop that includes one or more conditional load-safe invariant expressions. The conditional load-safe invariant expressions are not executed or resolved from within the alternative loops; rather they are loaded and executed separately outside the scope of the alternative loops. Other statements that are not invariant appear within the alternative loops unchanged for the compiled code 512.

The compiler 510 also produces the control data structure 511 as each conditional load-safe invariant expression is detected within an original loop. The control data structure 511 identifies a conditional load-safe invariant expression and the alternative loop to which it is associated. The control data structure 511 may include bit vectors for a plurality of alternative loops or may be associated with a specific alternative loop. In cases where the control data structure 511 is used for multiple alternative loops appearing within the compiled code 512, each entry within the control data structure 511 may identify a specific alternative loop; furthermore, each entry may include a string of flags or bits, where each flag or bit maps to a specific conditional load-safe invariant expression.

Initially, the flags or bits of the control data structure 511 are initialized to zeros or are to be unset. The processor 520 then begins to process the compiled code 512 by processing the original loops and ignoring the alternative loops within the compiled code 512. As statements are executed within the compiled code 512, they are compared to the control data structure 511, and flags or bits are set within the control data structure 511. As soon as each flag or bit for a given alternative loop is set within the control data structure 511, the processor 520 dynamically and in real time switches to the corresponding alternative loop for subsequent processing within the compiled code 512. An original loop's statements within the compiled code 512 are ignored once the processor 520 switches to its corresponding optimized alternative loop.

In an embodiment, the compiler 510 may also evaluate heuristics once alternative loops and the control data structure 511 are produced within the compiled code 512 and decide in response to the evaluation whether to remove the control data structure 511 and the alternative loops from the compiled code 512.

Figure 6:
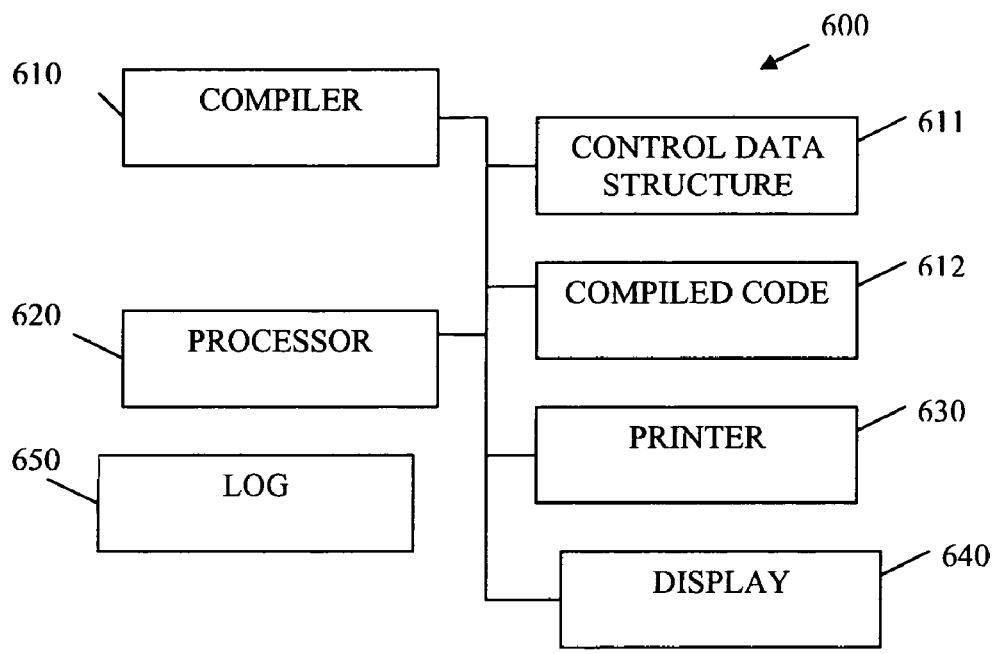
FIG. 6 is a diagram of an execution-driven loop splitting system, according to an example embodiment.

FIG. 6 is a diagram of an execution-driven loop splitting system 600, according to an example embodiment. The execution-driven loop splitting system 600 is implemented in a machine-accessible and readable medium.

The execution-driven loop splitting system 600 includes a compiler 610, a processor 620, and a printer 630. The compiler 610 produces the control data structure 611 and the compiled code 612. The processor 620 dynamically evaluates and modifies the control data structure 611 for purposes of deciding whether to switch to equivalent and optimized alternative loops identified within the compiled code 612 and produced by the compiler 620. The printer 630 may print results associated with the compiler 610 and/or the execution associated with the compiled code 612.

The techniques for producing the alternative loops that are optimized with conditional load-safe invariant expressions stripped for execution and loading therefrom were discussed in detail above. Moreover, the techniques for dynamically switching during execution of the compiled code 612 from original loop processing to alternative loop processing were discussed in detail above. Furthermore, the creation and use of the control data structure 611 were discussed above. These discussions are incorporated into the discussion here of the execution-driven loop splitting system 600.

The execution-driven loop splitting system 600 adds a printer 630 that may print results associated with processing the compiler 610 or processing the compiled code 612. In an embodiment, the execution-driven loop splitting system 600 also includes a display 640 to present the results. In yet another embodiment, the execution-driven loop splitting system 600 includes a log 650 to record or store the results in memory or storage.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter may lie in less than all features of a single disclosed embodiment. Thus the following claims are hereby incorporated into the Description of the Embodiments, with each claim standing on its own as a separate exemplary embodiment.

What is claimed is:

1. A processor-implemented method, comprising:
   processing executable code;
   detecting a loop within the executable code;
   identifying a loop conditional load-safe invariant expression within the loop that evaluates to true for a first time; and
   switching the processing associated with the loop to a different loop within the executable code for subsequent iterations after the first time, wherein the loop conditional load-safe invariant expression is loaded and executed outside a block of statements associated with the different loop, and wherein the loop conditional load-safe invariant expression is mapped to a control data structure associated with the executable code, the control data structure having a flag that corresponds to the loop conditional load-safe invariant expression of the loop, the flag originally set within the executable code by a compiler at compile time to false and set by a processor processing the method to true when the loop conditional load-safe invariant expression evaluates to true, which allows switching to the different loop for the subsequent iterations after the first time, and wherein the control data structure includes other flags for other loop conditional load-safe invariant expressions included within the executable code by the compiler at compile time.

2. The method of claim 1, wherein switching further includes processing the block of statements as a clone of the loop except for the separated loop conditional load-safe invariant expression which is referenced inside the block of statements but executed and loaded in advance from outside the block of statements.

3. A processor-implemented method, comprising:
   parsing a loop within a compiled code for one or more conditional load-safe invariant expressions;
   generating an alternative loop for the loop within the compiled code for statements within the loop, wherein the one or more conditional load-safe invariant expressions are referenced within the alternative loop but executed and loaded outside the alternative loop, and wherein other statements within the loop remain within the alternative loop; and
   creating a control data structure that identifies each of the one or more conditional load-safe invariant expressions via a bit included in the control data structure within the loop, and wherein the control data structure is evaluated when the compiled code executes and permits execution of the loop to branch to the alternative loop, and where each bit in the control data structure is initially set to false and when the compiled code executes each bit is set to true by a processor at run time when a corresponding conditional load-safe invariant expression associated with that bit is executed a first time within the compiled code.

4. The method of claim 3, wherein creating further includes uniquely numbering each of the one or more conditional load-safe invariant expressions from within the loop.

5. The method of claim 3 further comprising, comparing a size of the alternative loop to a threshold size and if the size is greater than or equal to the threshold size, then removing the alternative loop and the control data structure from the compiled code.

6. The method of claim 3 further comprising, comparing an identifier for the loop to a parameter value associated with the compiled code and if the loop value matches the parameter value, then removing the alternative loop and the control data structure from the compiled code.

7. A machine accessible medium having associated instructions, which when processed, result in a machine performing:
   generating a first block of statements within a compiled code for a loop;
   creating a second block of statements within the compiled code for the loop, wherein the second block of statements separates out conditional load-safe invariant expressions identified in the first block of statements and includes the conditional load-safe invariant expressions in a third block of statements, and wherein the conditional load-safe invariant expressions are executed and loaded from within the third block of statements; and
   producing a control data structure that identifies each of the conditional load-safe invariant expressions of the first block of statements via a flag for each of the conditional load-safe invariant expressions that is initially set to false in the compiled code and when a processor executes the compiled code each particular flag is set to true when a particular conditional load-safe invariant expression associated with that particular flag executes for a first time thereby causing the processor to execute the second and third block of statements for subsequent iterations of the loop during execution of the compiled code.

8. The medium of claim 7, further including instructions for deciding whether to remove the second block of statements, the third block of statements, and the control data structure from the compiled code based on one or more heuristics.

9. An apparatus, comprising:
a compiler having a control data structure, wherein the compiler is to split a loop identified within compiled code into an original loop and an alternative loop, and wherein the alternative loop is to separate out conditional load-safe invariant expressions detected in the original loop from the alternative loop, and the control data structure is to identify each conditional load-safe invariant expression of the original loop via a unique flag included in the control data structure that is initially set to false within the compiled code by the compiler and is set to true during execution of the compiled code when a particular conditional load-safe invariant expression is executed a first time thereby causing a processor that is executing the compiled code to execute a particular alternative loop that maps to that particular conditional load-safe invariant expression after it executed a first time within the compiled code; and
the processor to execute the compiler and the compiled code, and wherein the processor is to switch from the original loop to the alternative loop in response to evaluating the control data structure during execution of the compiled code.

10. The apparatus of claim 9, wherein the compiler is to evaluate whether to remove the alternative loop and the control data structure from the compiled code in response to one or more heuristics.

* * * * *